United States Patent
Baduge et al.

(10) Patent No.: US 9,641,445 B2
(45) Date of Patent: May 2, 2017

(54) COMMUNICATION APPARATUS, COMMUNICATION METHOD, AND PROGRAM

(71) Applicant: Panasonic Corporation, Osaka (JP)

(72) Inventors: Thilmee Baduge, Osaka (JP); Eiichi Muramoto, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 364 days.

(21) Appl. No.: 14/372,825

(22) PCT Filed: Jun. 13, 2013

(86) PCT No.: PCT/JP2013/003716
§ 371 (c)(1),
(2) Date: Jul. 17, 2014

(87) PCT Pub. No.: WO2014/010171
PCT Pub. Date: Jan. 16, 2014

(65) Prior Publication Data
US 2014/0362690 A1 Dec. 11, 2014

(30) Foreign Application Priority Data
Jul. 9, 2012 (JP) .................................. 2012-153277

(51) Int. Cl.
H04L 12/825 (2013.01)
H04L 12/863 (2013.01)
(Continued)

(52) U.S. Cl.
CPC ............ H04L 47/25 (2013.01); H04L 1/1887 (2013.01); H04L 47/50 (2013.01); H04L 69/324 (2013.01)

(58) Field of Classification Search
None
See application file for complete search history.

(56) References Cited

U.S. PATENT DOCUMENTS

| | | | |
|---|---|---|---|
| 2002/0004838 A1 | 1/2002 | Hakenberg et al. | |
| 2004/0025184 A1 | 2/2004 | Hakenberg et al. | |
| 2005/0144643 A1 | 6/2005 | Hakenberg et al. | |
| 2005/0154965 A1* | 7/2005 | Ichiki ................ | H03M 13/2707 714/776 |

(Continued)

FOREIGN PATENT DOCUMENTS

| | | |
|---|---|---|
| JP | 2001-274861 | 10/2001 |
| JP | 2005-064648 | 3/2005 |

(Continued)

OTHER PUBLICATIONS

International Search Report issued Jul. 23, 2013 in International (PCT) Application No. PCT/JP2013/003716.

(Continued)

Primary Examiner — Ayaz Sheikh
Assistant Examiner — Sori Aga
(74) Attorney, Agent, or Firm — Wenderoth, Lind & Ponack, L.L.P.

(57) ABSTRACT

A communication apparatus includes a packet output unit that performs normal transmission of a normal packet and retransmission of at least one retransmission packet, a feedback receiver that receives a retransmission request that designates a retransmission packet to request retransmission, and a controller that determines that the retransmission packet for the received retransmission request is to be transmitted or is scheduled to be transmitted based on an amount of data scheduled to be transmitted for a predetermined period.

13 Claims, 10 Drawing Sheets

(51) Int. Cl.
H04L 29/08 (2006.01)
H04L 1/18 (2006.01)

(56) References Cited

U.S. PATENT DOCUMENTS

2010/0158119 A1  6/2010  Hamanaka
2011/0228845 A1* 9/2011  Banerjee ............... H04L 1/0002
                                              375/240.07

FOREIGN PATENT DOCUMENTS

| JP | 2005-136548 | 5/2005 |
| JP | 2005-198191 | 7/2005 |
| JP | 2007-013419 | 1/2007 |
| JP | 2007-019705 | 1/2007 |

OTHER PUBLICATIONS

Hiroaki Hagino, "Playtime-oriented Retransmission Control Method for Multimedia Streaming", IPSJ Journal, vol. 45, No. 2, Feb. 15, 2004 (Feb. 15, 2004), pp. 402-411.

H. Schulzrinne, et al., "RFC 1889 RTP: A Transport Protocol for Real-Time Applications", [online], Jan. 1996, IETF [searched on Jul. 4, 2012], Internet <URL: http://www.ietf.org/rfc/rfc1889.txt>.

H. Schulzrinne, "RFC 1890 RTP Profile for Audio and Video Conferences with Minimal Control", [online], Jan. 1996, IETF, [searched on Jul. 4, 2012], Internet <URL: http://www.ietf.org/rfc/rfc1890.txt>.

J. Ott, et al., RFC 4585 Extended RTP Profile for Real-time Transport Control Protocol (RTCP)-Based Feedback (RTP/AVPF), [online], Jul. 2006, IETF, [searched on Jul. 4, 2012], Internet <URL: http://www.ietf.org/rfc/rfc4585.txt>.

J. Rey, et al., "RFC 4588 RTP Retransmission Payload Format", [online], Jul. 2006, IETF, [searched on Jul. 4, 2012] Internet <URL: http://www.ietf.org/rfc/rfc4588.txt>.

"Transparent end-to-end Packet-switched Streaming Service (PSS); Protocols and codecs" (3GPP TS 26.234 version 10.4.0 Release 10), [online], Mar. 2012, 3GPP, [searched on Jul. 4, 2012], Internet <URL:http://www.etsi.org/deliver/etsi_ts/126200_126299/126234/10.04.00_60/ts_126234v100400p.pdf>.

* cited by examiner

COMMUNICATION APPARATUS, COMMUNICATION METHOD, AND PROGRAM

TECHNICAL FIELD

The present invention relates to a communication apparatus, a communication method, a computer program, and an integrated circuit for improving accuracy of transmission rate control (retransmission control and data transmission control) in an environment in which retransmission is executed.

BACKGROUND ART

An RTP (Real-time Transport Protocol) is used as a protocol to transmit/receive real-time data such as Audio and Video on an IP network (NPLT 1). The RTP includes an RTP control protocol (RTCP) as a control protocol. In consideration of scalability in terms of the number of terminals participating in an RTP session, the RTCP is designed such that consumption of public network resources by overhead of control for data transfer is minimized (NPLT 2). For example, a receiver report (RR) is data that is statistically processed based on received data for a predetermined period, and a transmission frequency of the RR is limited.

In recent years, with an increase in speed of a network configuration line and diversification of usage patterns such as use of an Internet protocol group such as an RTP/RTCP in a private system and use of the Internet protocol group in a mobile system, retransmission can be applied to a kind of control feedback of an RTP serving as an extension (NPLT 3, NPLT 4, and NPLT 5). In this manner, the retransmission can be requested on a granularity in units of RTP packets (sequence numbers) constituting the real-time data.

CITATION LIST

Non-Patent Literatures

NPLT 1: H. Schulzrinne, other 2 persons, "RFC 1889 RTP: A Transport Protocol for Real-Time Applications", [online], January, 1996, IETF, [searched on Jul. 4, 2012], Internet <URL: http://www.ietf.org/rfc/rfc1889.txt>

NPLT 2: H. Schulzrinne, "RFC 1890 RTP Profile for Audio and Video Conferences with Minimal Control", [online], January, 1996, IETF [searched on Jul. 4, 2012], Internet <URL: http://www.ietf.org/rfc/rfc1890.txt>

NPLT 3: J. Ott, other 4 persons, "RFC 4585 Extended RTP Profile for Real-time Transport Control Protocol (RTCP)-Based Feedback (RTP/AVPF), [online], July 2006, IETF, [searched on Jul. 4, 2012], Internet <URL: http://www.ietf.org/rfc/rfc4585.txt>

NPLT 4: J. Rey, other 4 persons, "RFC 4588 RTP Retransmission Payload Format", [online], July 2006, IETF, [searched on Jul. 4, 2012], Internet <URL: http://www.ietf.org/rfc/rfc4588.txt>

NPLT 5: "Transparent end-to-end Packet-switched Streaming Service (PSS); Protocols and codecs" (3GPP TS 26.234 version 10.4.0 Release 10), [online], March 2012, 3GPP, [searched on Jul. 4, 2012], Internet <URL: http://www.etsi.org/deliver/etsits/126200_126299/126234/10.04.00_60/ts_126234v100400p.pdf>

SUMMARY OF THE INVENTION

Technical Problem

FIG. 12 is a diagram for describing a problem to be solved by the invention.

In the figure, the horizontal axis indicates time. Current time is time t (reference time) at which retransmission is requested. The vertical axis indicates Bandwidth (representing a bit-rate used in data transmission or retransmission of an RTP for a unit time) in percentages (%) obtained by setting a value of BW(t) serving as an upper limit of an available bandwidth to 100%.

Bandwidth A is available bandwidth BW(t) of transmission data measured in a transport layer or higher at current time t.

Bandwidth B is a bandwidth to scheduled to be used in the first transmission (hereinafter, referred to as normal transmission of a normal packet) of an RTP packet specified by a certain sequence number.

Bandwidth C is a bandwidth to be used in the second or subsequent transmission (hereinafter, referred to as retransmission of a retransmission packet) of the RTP packet, when the retransmission is applied.

In the example in the figure, a use amount of the normal transmission of the normal packet is smaller than 95% that is lower than that in available bandwidth BW(t).

However, when the retransmission of retransmission packets represented by all retransmission requests are permitted, a use amount exceeds the use amount in an available bandwidth around certain time t (from time t to T in the example in FIG. 12). In the figure, an area of a dotted-line frame (data_ex) represents an estimated value of an excessive data amount that is estimated to be larger than 100% by retransmission at time T including current time t.

Solution to Problem

In an embodiment of this disclosure, a communication apparatus includes a packet output unit that performs normal transmission of a normal packet and retransmission of at least one retransmission packet, a feedback receiver that receives a retransmission request that designates a retransmission packet to request retransmission, and a controller that determines that a retransmission packet for the received retransmission request is to be transmitted or is scheduled to be transmitted, based on an amount of data scheduled to be transmitted for a predetermined period.

Advantageous Effect of Invention

According to an embodiment of this disclosure, a response schedule to a retransmission request for a retransmission packet to be determined can be determined based on a transmission data amount by a normal packet and a transmission data amount by each retransmission packet.

Moreover, a rate can be controlled based on information of some retransmission packets scheduled to be retransmitted (or not scheduled to be retransmitted) of the retransmission packets requested to be retransmitted.

DESCRIPTION OF EMBODIMENTS

Figure 1:
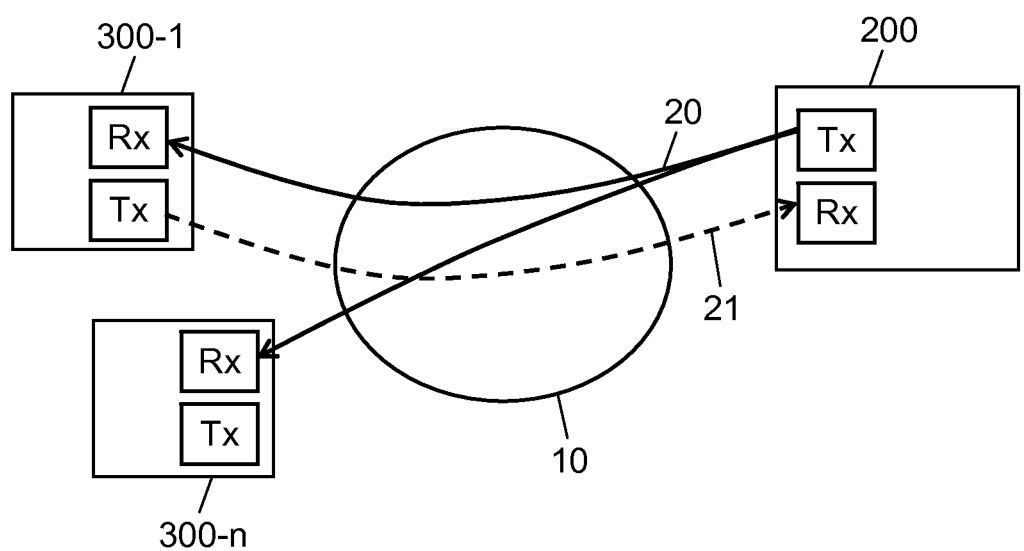
FIG. 1 is a schematic diagram of a system to which a communication apparatus (communication method) according to a first exemplary embodiment is applied.

In an embodiment of this disclosure, the controller determines that the retransmission packet to be determined is scheduled to be transmitted when a total data amount of the data amount and a data amount of the retransmission packet to be determined does not exceed an amount of data that is transmitted for a predetermined period.

In a certain embodiment, the controller derives the predetermined period based on information for specifying a retransmission packet included in the retransmission request.

In a certain embodiment, specifying information in the retransmission request includes a sequence number, and the controller derives the predetermined period based on a retransmission packet time stamp value, the sequence number, or other information described in the retransmission request.

In a certain embodiment, the controller rearranges an order of predetermined periods of the at least one retransmission packet such that the periods are determined in order from a shorter period.

In a certain embodiment, a communication apparatus further includes a continuous media data output unit that outputs contents at a designated target transmission rate, wherein the controller updates the target transmission rate based on the determination result.

In a certain embodiment, the controller instructs the continuous media data output unit to decrease the target transmission rate when the number of retransmission packets determined not to be scheduled to be transmitted for a unit time is larger than a predetermined value.

In a certain embodiment, an RTP packet output unit has a queue to output a normal packet at a predetermined rate, the controller instructs the RTP packet output unit to retransmit the retransmission packet determined to be scheduled to be transmitted, and the RTP packet output unit stores in the queue the retransmission packet instructed to be retransmitted.

In a certain embodiment, the controller acquires an available bandwidth BW(t), and acquires information related to data scheduled to be transmitted. The controller acquires a predetermined period Tk about a kth retransmission packet (k is an integer of 0 or more) for at least one retransmission packet designated by the information related to the retransmission request, with a notification of information related to the retransmission request as a trigger, and acquires data amounts of a normal packet and a retransmission packet that are determined to be scheduled to be transmitted for the predetermined period Tk. When the kth retransmission packet is transmitted, the controller determines that the kth retransmission packet is scheduled to be transmitted when an applied bandwidth in the predetermined period Tk does not exceed the available bandwidth, and sequentially repeats the processes.

In the embodiment of this disclosure, a communication method includes the steps of receiving a retransmission request that designates at least one retransmission packet to request retransmission, determining that a retransmission packet for the received retransmission request is to be transmitted or is scheduled to be transmitted, based on an amount of data scheduled to be transmitted for a predetermined period, and performing normal transmission of a normal packet and retransmission of the retransmission packet.

In the embodiment of this disclosure, a program includes the steps of receiving a retransmission request that designates at least one retransmission packet to request retransmission, determining that a retransmission packet for the received retransmission request is to be transmitted or is scheduled to be transmitted, based on an amount of data scheduled to be transmitted for a predetermined period, and performing normal transmission of a normal packet and retransmission of the retransmission packet.

The embodiments of the present invention will be described in detail below with reference to the accompanying drawings.

First Exemplary Embodiment

FIG. 1 is a schematic diagram of a system to which a communication apparatus (communication method) according to a first exemplary embodiment is applied. Data transmission apparatus 200 can communicate with other communication apparatuses 300-1 to 300-n in 4 or more layers through IP network 10.

In the figure, a solid-line arrow indicates a direction of data transmission (hereinafter, including normal transmission and retransmission) of real-time data 20 in which real-time data is transmitted from a transmission side to a reception side with respect to one certain session S1. The data transmission typically uses an RTP/UDP. A broken-line arrow indicates a direction of communication of feedback data 21 fed back from the reception side to the transmission side with respect to session S1. The feedback communication typically uses an RTCP/UDP. Feedback data 21 includes a receiver report (RR) described in NPLT 1 and GenericNACK (described in NPLT 3, to be described later) that designates at least one retransmission packet to request retransmission.

In the figure, data transmission apparatus 200 and other communication apparatus 300-1 are discriminated from each other in the direction of one certain session S1. In a session (for example, reverse data transmission) different from session S1, data transmission apparatus 200 supports the function of communication apparatus 300-1.

Figure 2:
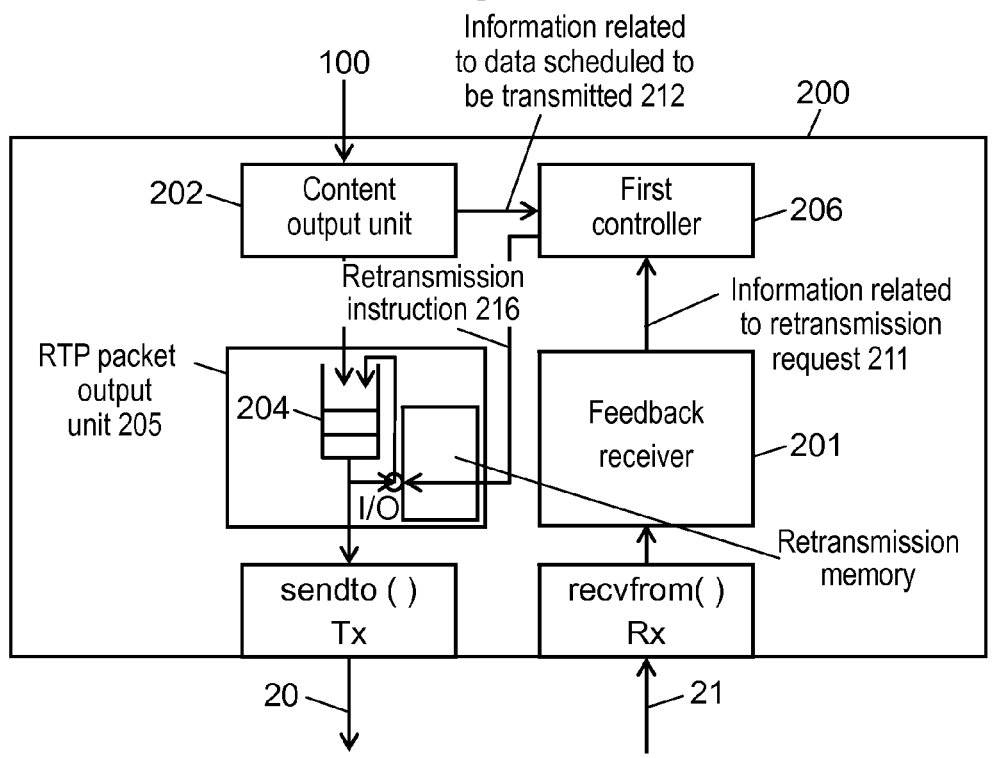
FIG. 2 is a functional block diagram of data transmission apparatus 200.

FIG. 2 is a functional block diagram of data transmission apparatus 200.

Data transmission apparatus 200 includes content output unit 202, RTP packet output unit 205, Tx unit, Rx unit, feedback receiver 201, and first controller 206.

Transmission System

Content output unit 202 compresses and encodes input signal 100 (for example, a video signal) and adapts the signal to a Profile/Payload format designated by session S1 to output the resultant signal as payload data. Content output unit 202 outputs, to first controller 206, output scheduled data amount AD (enc_t) for each unit time enc_t (interval of loop L2 in FIG. 4) as "information 212 related to data scheduled to be transmitted".

RTP packet output unit 205 has transmission data buffer 204 that accumulates output data from content output unit 202. RTP packet output unit 205 has a retransmission memory in case of a retransmission request. Depending on ACK/NACK modes in section 3.6 of NPLT 3, a transmitted normal packet is held in the retransmission memory for a time until an area of each RTP packet is permitted to be released. RTP packet output unit 205 outputs, to the transmission data buffer, a retransmission packet (corresponding to a normal packet) designated in response to the retransmission instruction from first controller 206. RTP packet output unit 205 outputs the retransmission packet to the Tx unit such that, in the buffer, a total amount of (1) a data amount by the normal packet and (2) a data amount by the retransmission packet in a predetermined time section is made uniform as much as possible in a plurality of time sections.

Tx unit (sendto( )) transmits a datagram generated by RTP packet output unit 205 to IP network 10 by using a communication stack of a lowermost layer.

Feedback Receiving System

Rx unit (recvfrom( )) separates a UDP packet received from IP network 10 by a port number (for example, 5005) to output the datagram to feedback receiver 201.

Feedback receiver 201 receives a retransmission request that designates at least one retransmission packet to request retransmission. The retransmission request that designates at least one retransmission packet to request retransmission is, for example, GenericNACK serving as a retransmission request of an RTP packet.

Figure 3:
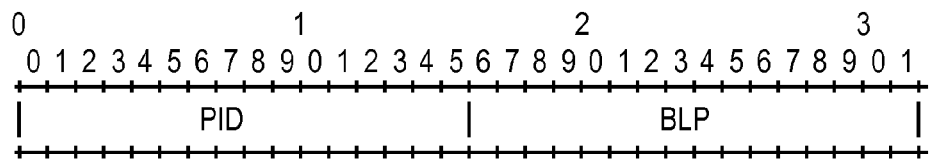
FIG. 3 is a diagram showing syntax of RFC4585 GenericNACK.

FIG. 3 is a diagram showing syntax of RFC4585 GenericNACK. GenericNACK is used to show a loss of at least one RTP packet when four layers that carry the RTP data do not provide a retransmission mechanism. A PID (Packet ID) of 16 bits at the head represents the sequence number of a lost RTP packet. BLT (bitmask of following lostpackets) of 16 bits at the last half is a field to show a situation of loss (or arrival) of an RTP packet having a sequence number following the PID.

Feedback receiver 201 notifies first controller 206 of "information 211 related to a retransmission request" including a retransmission request (r0 to rn (including n=0)) that designates at least one retransmission packet to request retransmission.

Controller

Figure 5:
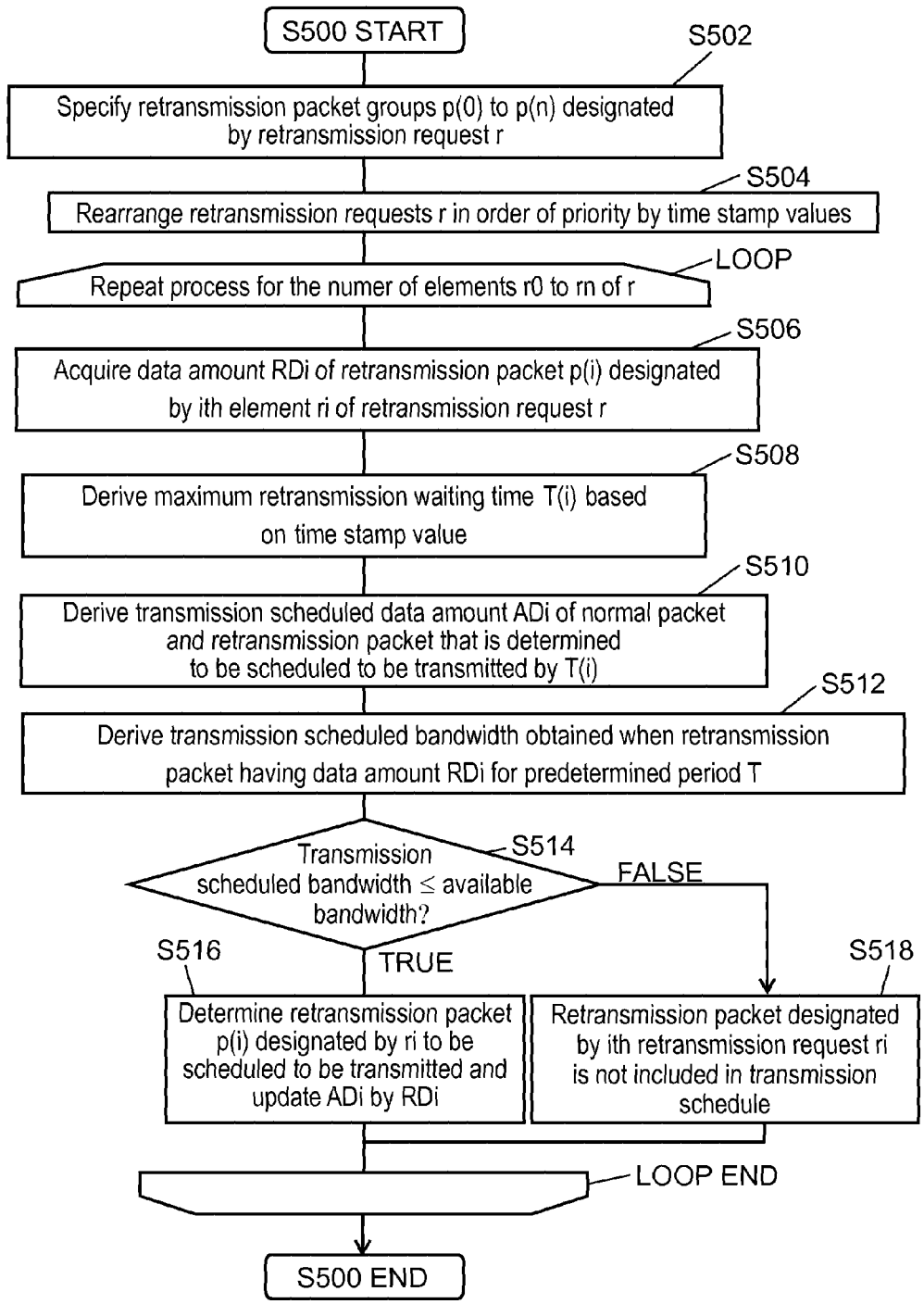
FIG. 5 is a detailed flow chart of a determination flow of a retransmission packet scheduled to be retransmitted in step S500.

First controller 206 performs a process of sequentially determining whether or not the next retransmission packet is scheduled to be transmitted based on the data amounts of a normal packet and a retransmission packet determined to be scheduled to be transmitted for a predetermined period. The data input situations or the like of the output buffer and the Rx unit in content output unit 202 are monitored, "information 212 related to data scheduled to be transmitted" and "information 211 related to retransmission request" are input, and a flow of determining the retransmission packet scheduled to be retransmitted shown in FIG. 5 is executed. In order to execute retransmission of the retransmission packet determined to be scheduled to be transmitted, retransmission instruction 216 is issued to the I/O of the retransmission memory in RTP packet output unit 205.

Figure 4:
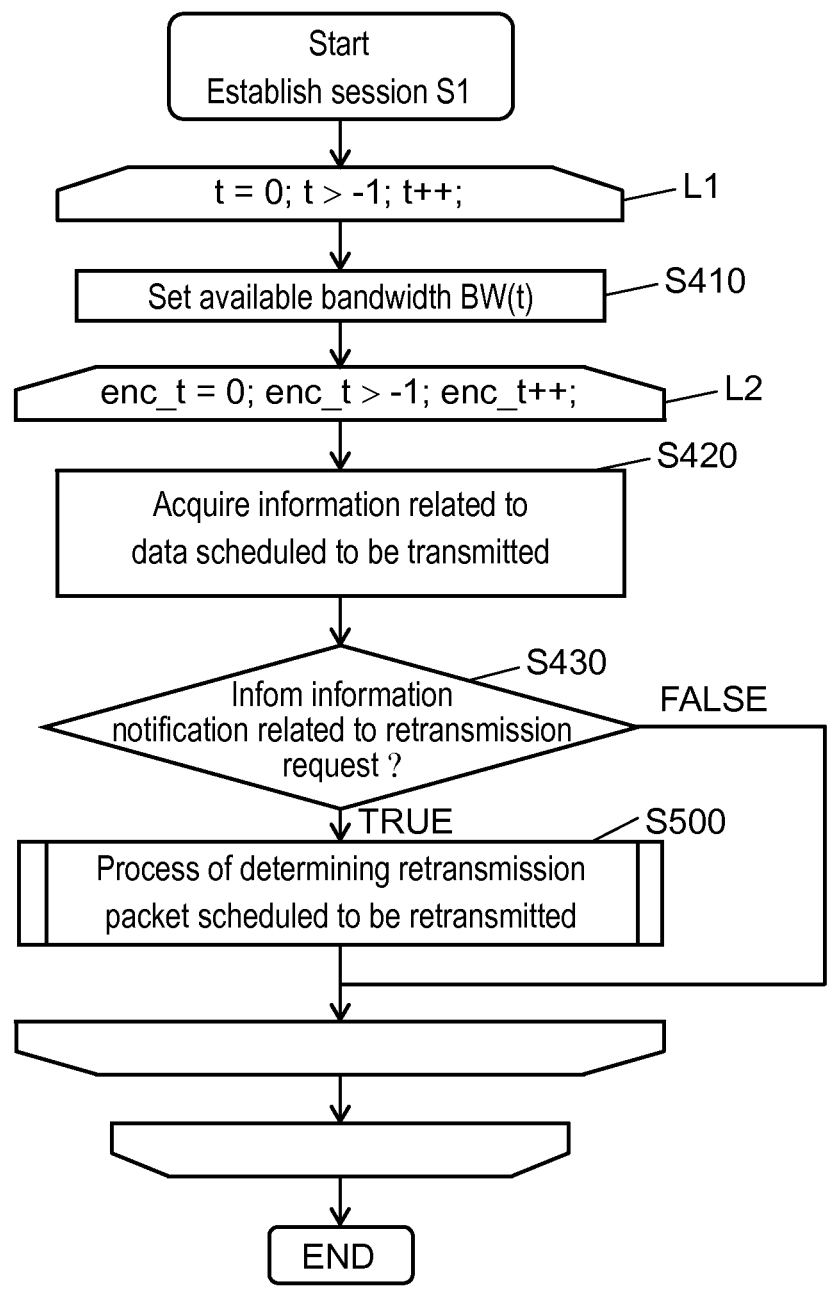
FIG. 4 is a flow chart showing an outline of a determination flow of a retransmission packet scheduled to be retransmitted by first controller 206.

FIG. 4 is a flow chart showing an outline of a determination flow of a retransmission packet scheduled to be retransmitted by first controller 206.

First controller 206 establishes session S1 (START).

In step S410, first controller 206 acquires available bandwidth BW(t). Loop L1 in the figure shows that available bandwidth BW(t) can be updated and acquired at every predetermined interval.

In step S420, first controller 206 acquires "information 212 related to data scheduled to be transmitted" (AD (enc_t)). This "information 212 related to data scheduled to be transmitted" is acquired from an encoder, for example, every time enc_t (or every timing at which data is output). Above-mentioned Loop L2 in the figure conceptually shows that the information related to data scheduled to be transmitted is updated and acquired.

In step S430, first controller 206 changes processes depending on whether or not first controller 206 receives a notification including r serving as information 211 related to retransmission request. Here, r is a retransmission request that designates at least one retransmission packet to request retransmission, and r is an array including r0 to rn as elements of the array. When a determination result is TRUE (when an event notification of a retransmission request is given), a retransmission determining process (step S500) is executed.

When the determination result in S430 is FALSE (when an event notification of a retransmission request is not given), the controller returns to the normal process because retransmission is not requested.

FIG. 5 is a detailed flow chart of a determination flow of a retransmission packet scheduled to be retransmitted in step S500. First controller 206 executes the flow upon receipt of notification of information 211 related to retransmission request.

In step S502, first controller 206 specifies at least one retransmission packet (0 to n) requested by at least one retransmission request r (r0 to rn) included in information 211 related to retransmission request.

In step S504, first controller 206 changes an order of retransmission requests r0 to rn by predetermined attribute values of retransmission packets (0 to n) to acquire r0 to rn arranged in the order of priority. The attribute value is, for example, a value (pT0 to pTn) of a time stamp added to the header of an RTP packet. When the time stamp values (pT1, pT2, and pT3) in a plurality of RTP packets designated to be requested to be retransmitted are equal to each other, orders held in the retransmission memory (orders of sequence numbers) are used in combination with each other.

In the following operations, first controller 206 repeats, the processes in step S506 to step S518 for retransmission requests r0 to rn rearranged in the order of priority, the number of times (n+1) equal to the number of RTP packets requested to be retransmitted.

As to i=0, Retransmission Request r0 Having First Priority

In step S506, first controller 206 acquires data amount RD0 of retransmission packet p(0) designated by first element r0 of retransmission request r.

In step S508, first controller 206 derives maximum retransmission waiting time T(0) based on a time stamp value. Maximum retransmission waiting time T(0) is a maximum time for which transmission of a payload of a packet designated by r0 can be delayed. For example, above maximum retransmission waiting time T can be derived as T=(pT0−ut)−L by using presentation time pT0, current time (real time ut), and time L required to transmit data from the transmission side to the reception side. Delay time L can be derived from RTT obtained by combining transmitter report SR and receiver report RR of RTCP or a value (optional value of Metric) when the value can be used in the retransmission request.

In step S510, first controller 206 derives transmission scheduled data amounts AD0 of (a) a normal packet and (b) a retransmission packet that is determined to be scheduled to be transmitted by period T0.

Firstly, first controller 206 derives transmission scheduled data amount AD0 of (a) the normal packet. A value of AD (enc_t) given each time enc_t is updated by loop L2 in FIG. 4 is derived by performing addition processing of AD for a section having current time t as a start point and T(0) as end time.

Then, first controller 206 derives transmission scheduled data amounts of (b) a retransmission packet that is already determined to be scheduled to be transmitted by period T0. In this case, at the time of i=0, there is no retransmission packet determined (already determined) to be scheduled to be transmitted. Thus, at the time of i=0, a data amount of the retransmission packet determined to be scheduled to be transmitted is 0.

In step S512, first controller 206 derives a transmission scheduled bandwidth obtained when a retransmission packet of data amount RD0 is transmitted in predetermined period T(0). The transmission scheduled bandwidth is a bit-rate value obtained by dividing a total data amount of data amount AD0 determined to be scheduled to be transmitted and transmission scheduled data amount RD0 of a retransmission packet by predetermined period T(0).

In step S514, first controller 206 compares a transmission scheduled bandwidth obtained when a packet of data amount RD0 is transmitted in predetermined period T(0) with available bandwidth BW(t).

The comparison in above step S514 is equivalent to determining whether or not data amount RD0 of the retransmission packet to be determined to be scheduled to be transmitted can be added to an amount of data that can be transmitted when the data is transmitted at a rate of (a) available bandwidth BW(t) by predetermined period T(0) without making the data overflow, and derivation may be performed based on a transmission data amount allowed to be transmitted for a predetermined period.

As a result of the comparison in step S514, first controller 206 performs comparison by using a total data amount of "transmission data amount AD0 and data amount RD0 of a retransmission packet to be determined that are already determined to be scheduled to be transmitted in predetermined period T(0)" at the time of the current process.

Comparison Result 1

As a result of the comparison, when a transmission scheduled bandwidth used when data of the total data amount is transmitted by using a time corresponding to above predetermined period T(0) does not exceed available bandwidth BW(t), retransmission packet p(0) to be determined at present is determined to be scheduled to be transmitted (step S516 when determined as TRUE in step S514).

The determination process is a process to determine retransmission data amount by a retransmission request as transmission of data transmission. Thus, data amount AD0 in period T(0) is updated by data amount RD0 of retransmission packet p(0) newly determined to be scheduled to be transmitted by the process. At the same time, retransmission instruction 216 is issued to RTP packet output unit 205 such that retransmission packet p(0) designated by r0 is read and stored in a transmission packet buffer.

Comparison Result 2

As a result of the comparison, when the transmission scheduled bandwidth exceeds available bandwidth BW(t) (that is, when data amount RD0 of an RTP retransmission packet transmitted by retransmission request r0 is larger than a data amount that can be transmitted for period T0, retransmission packet p(0) designated by retransmission request r0 is not included as being scheduled for transmission (step S518 when determined as FALSE in step S514).

As to i=1~, Retransmission Requests r1~Having Second and Subsequent Priorities

With respect to second retransmission request r~, processes in step S506 to step S518 are performed.

In this case, it should be noted that, in step S510, transmission scheduled data amount ADi of the normal packet and the retransmission packet that are determined to be scheduled to be transmitted is coupled with the determination result in S514 for r0. Thereafter, processes for r0 to rn are performed to retransmission packets designated by all retransmission requests notified at a predetermined timing until the processes are completed.

Figure 6:
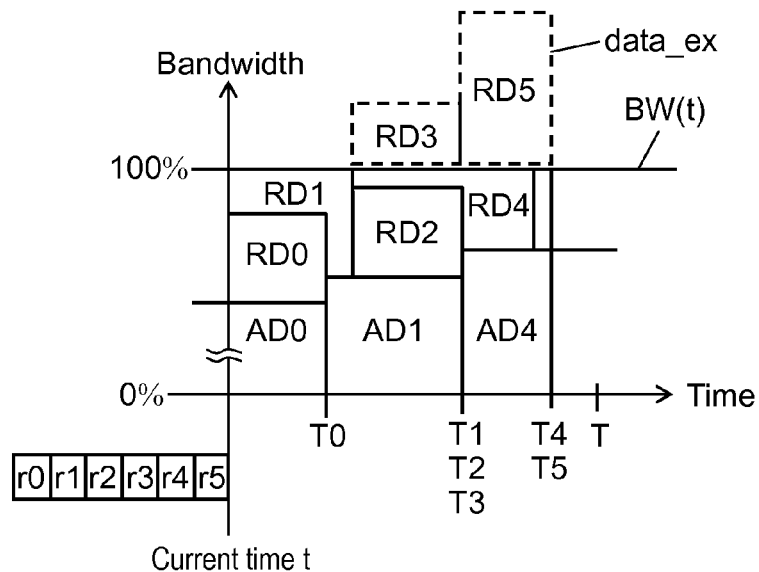
FIG. 6 is a conceptual diagram showing an applied bandwidth obtained by a communication apparatus (communication method) according to the first exemplary embodiment.

FIG. 6 is a conceptual diagram showing an applied bandwidth obtained by a communication apparatus (communication method) according to the first exemplary embodiment.

Figure 12:
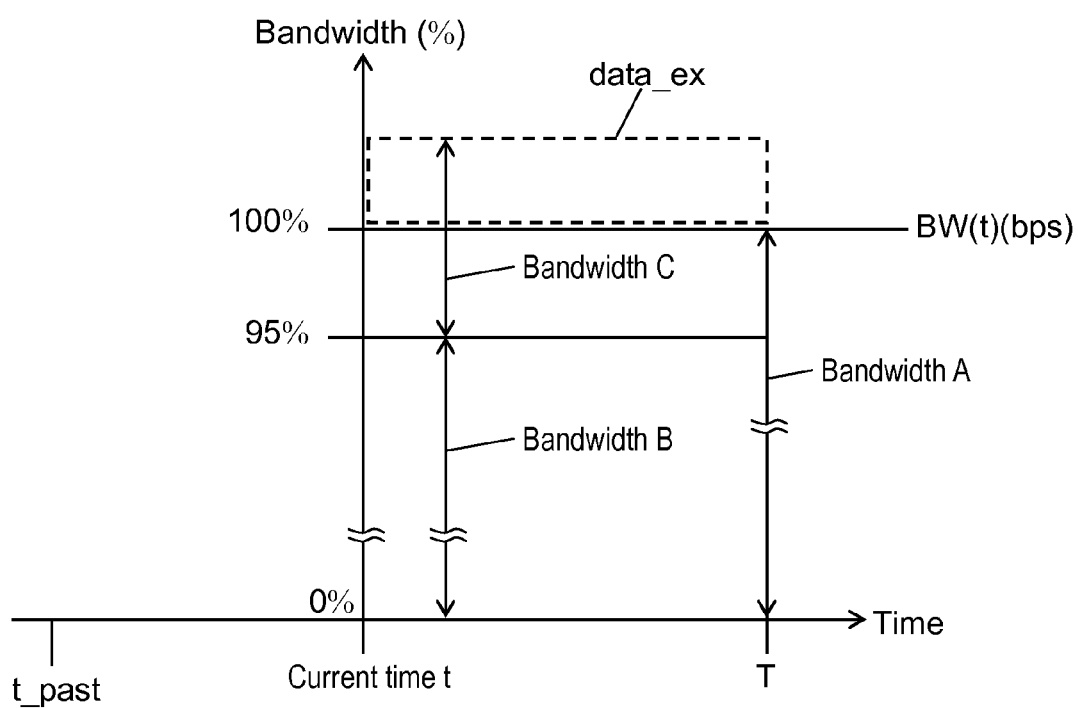
FIG. 12 is a diagram for describing a problem to be solved by the invention.

For comparison, the same definition of the axes and values T, Bandwidth, and BW(t) as in FIG. 12 are used in FIG. 6.

As to Time of Horizontal Axis

Current time t is a timing at which feedback receiver 201 receives retransmission request r that designates at least one retransmission packet to request retransmission, and notifies first controller 206 of retransmission request r. Here, r is to request retransmission of retransmission packets r0 to r5. In step S504, first controller 206 rearranges values pT0 to pT5 of time stamps of the retransmission packets (RTP packets) in the ascending order of the values.

T0 is a value derived by first controller 206 in step S508. The value is maximum retransmission waiting time T0 (that is, presentation time pT0−(current time t+delay time L)) of an RTP packet designated by r0 when current time t is set to reference time 0.0. T1, T2, and T3 show a state in which values pT (pT1 to pT3) of the time stamps of retransmission packets requested to be retransmitted by retransmission requests r1 to r3 are equal to each other. Similarly, T4 and T5 also show maximum retransmission waiting times about RTP packets each having the same value pT.

As to Bandwidth of Vertical Axis

AD0, AD1, and AD4 are examples of data amounts derived in step S510. RD0 to RD5 are examples of data amounts RD0 to RD5 derived in step S506.

Explanation of Operation

In the example in FIG. 1, even though data of data amount RD0 is transmitted, the bandwidth does not exceed available bandwidth BW(t) within time until T0. For this reason, it is determined as TRUE in S514. Thus, a retransmission packet requested by r0 corresponds to a "retransmission packet determined to be scheduled to be transmitted", and data amount RD0 is added as a data use amount for period T0.

Similarly, RD1 (data amount r1) and RD2 (data amount r2) are determined as TRUE in the determination in S514, and retransmission packets requested by r1 and r2 are "retransmission packets determined to be scheduled to be transmitted" in the next determination. However, in response to r3 that requests retransmission packet p(3) having data amount RD3, the data amount exceeds a transmission scheduled data amount allowed in available bandwidth BW(t) for a period until time T3. This is because, for a period until time T3, first controller 206 determines whether or not a retransmission packet to be determined is scheduled to be transmitted by adding not only the data amount of a normal packet but also RD0, RD1, and RD2 serving as data amounts of retransmission packets to a data amount determined to be scheduled to be transmitted in the current process. Note that the bandwidth of RD3 may also be lowered so as not to cause the data amount to exceed the transmission scheduled data amount.

In a packet requested by r4, maximum waiting time T4 is longer than T3. Thus, for the period of T4, retransmission packet p(4) having data amount RD4 can be still scheduled to be retransmitted. Therefore, AD4 in the section of T4 is updated by using data amount RD4. However, furthermore, in order to try to response to r5 that requests retransmission packet p(5) having data amount RD5, the data amount exceeds a transmission scheduled data amount allowed in available bandwidth BW(t) for a period until time T5. For this reason, with respect to r5, a packet is not determined as a packet scheduled to be transmitted. The bandwidth of RD5 may also be lowered so as not to cause the data amount to exceed the transmission scheduled data amount.

As described above, the communication apparatus according to the first exemplary embodiment includes a feedback receiver that receives a retransmission request that designates at least one transmission packet to request retransmission, and a controller that sequentially determines whether or not the next retransmission packet is determined to be scheduled to be transmitted based on the data amounts of a normal packet and a retransmission packet that are determined to be scheduled to be transmitted for a predetermined period.

In this manner, a response schedule to a retransmission request for a retransmission packet to be determined can be determined based on a transmission data amount by a normal packet and a transmission data amount by each retransmission packet.

Second Exemplary Embodiment

Figure 7:
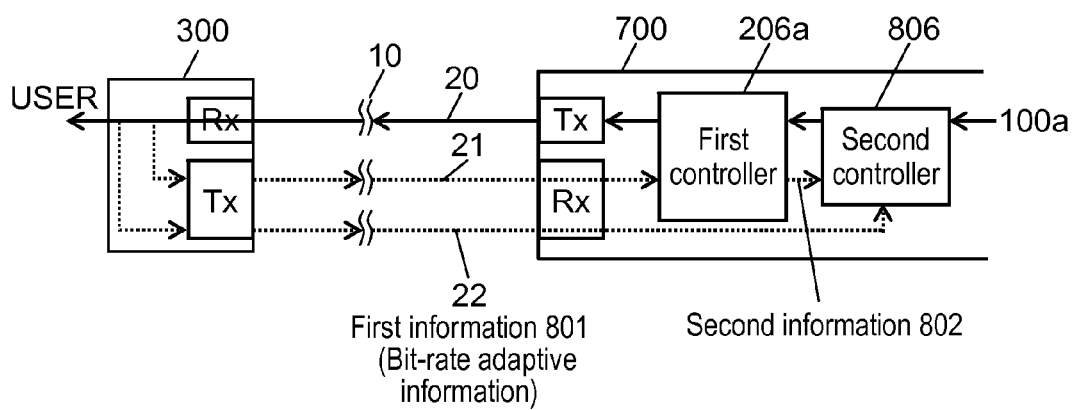
FIG. 7 is a schematic diagram of a system applied with data transmission apparatus 700 in which a communication method according to a second exemplary embodiment is implemented.

FIG. 7 is a schematic diagram of a system applied with data transmission apparatus 700 in which a communication method according to a second exemplary embodiment is applied.

The same reference numerals as in FIG. 1 denote the same or corresponding elements in the system in FIG. 7, and a detailed description thereof will be omitted.

Data transmission apparatus 700 corresponds to data transmission apparatus 200 according to the first exemplary embodiment. However, data transmission apparatus 700 provides an end-to-end service for communication apparatus 300 with respect to continuous media (see NPLT 5) 100a of types the number of which is larger than that of input signals 100.

As in the first exemplary embodiment, solid-line and broken-line arrows having two directions in the figure simulate directions of feedbacks. Arrow 20 and arrow 21 are the same as those in the description of the system according to the first exemplary embodiment. That is, the arrows indicate a feedback loop that controls behaviors of transmission control (both normal transmission and retransmission) of a transport layer with respect to sending of data 20 after the establishment of session S1.

In addition, in the system according to the second exemplary embodiment, a feedback to more adaptively control output rates of continuous media in data transmission apparatus 700 is executed. This process is a "Bit-rate adaptive process" (hereinafter, referred to as a bit-rate adaptive process) described in "Adaptation of continuous media" in Chapter 10 of NPLT 5. For this reason, first information serving as bit-rate (Bit-rate) adaptive information extended to an application layer is fed back. The first information to be fed back includes various metrics called QoE (Quality of Experience) Metric described in NPLT 5 that intends to improve somesthetic quality of USER in the figure.

Data transmission apparatus 700 includes, in addition to first controller 206a, second controller 806 and receives feedbacks (21 and 22) of two or more types of layers to adaptively control the output rates of continuous media.

Figure 8:
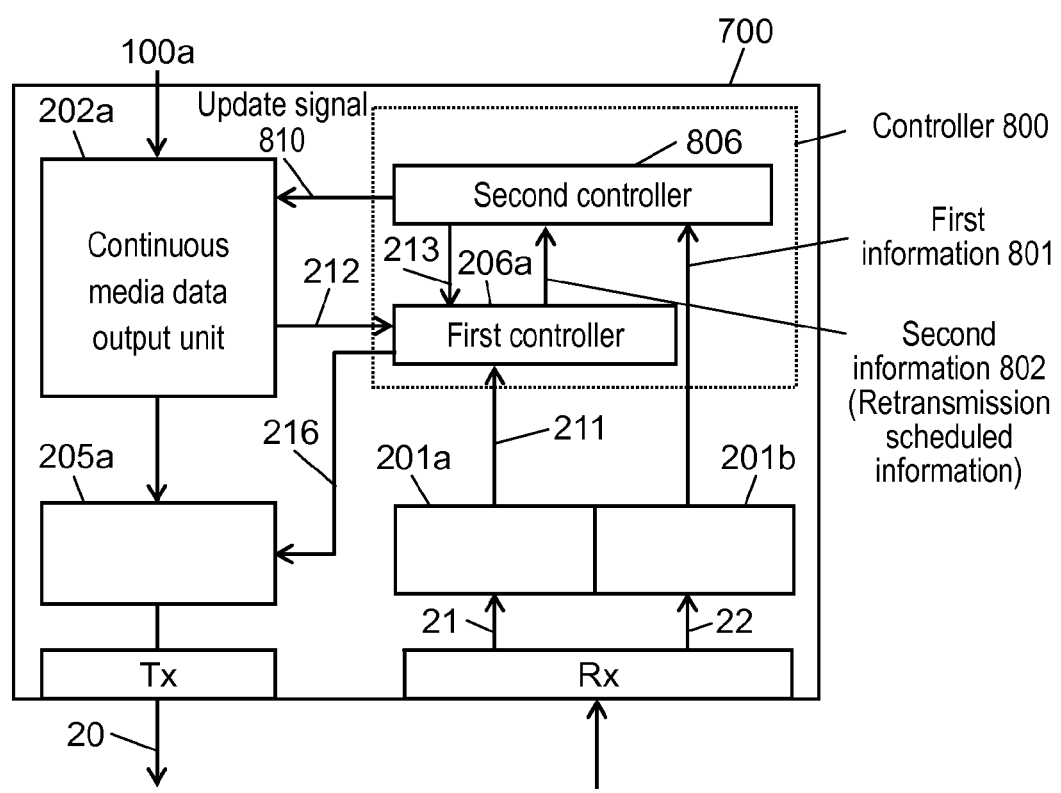
FIG. 8 is a functional block diagram of data transmission apparatus 700 according to the second exemplary embodiment.

FIG. 8 is a functional block diagram of data transmission apparatus 700 according to the second exemplary embodiment.

Data transmission apparatus 700 includes continuous media data output unit 202a, RTP packet output unit 205a, a Tx unit, an Rx unit, feedback receiver 201a, bit-rate adaptive information receiver 201b, and controller 800.

In the figure, the same reference numerals as in FIG. 2 denote the same or corresponding functions as the functional blocks in FIG. 2 in the first exemplary embodiment. Functional blocks different from the functional blocks in the first exemplary embodiment will be described below.

Transmission System

Continuous media data output unit 202a corresponds to content output unit 202 in the first exemplary embodiment. This system intends to correspond to payload data outputs about continuous media 100a of types the number of which is larger than that of input signals 100. Continuous media 100a of many types include audio, video, speech, and timed text. The one or more media are multiplexed as needed while being arranged in a predetermined format and the like, changed to a predetermined Payload Format according to a Profile or the like determined in the establishment of session S1, and output as an RTP payload.

Continuous media data output unit 202a includes a function that adaptively changes a content rate (following the definition of "content rate" in NPLT 5, the same applies hereinafter) of data of continuous media, depending on designation of update signal 810 from controller 800. RTP packet output unit 205a corresponds to RTP packet output unit 205 in the first exemplary embodiment.

Feedback Information Receiving System

The Rx unit provides a datagram to upper processors (201a and 201b) such that feedback data 21 including a retransmission request is separated from bit-rate adaptive information 22 based on received protocols (RTCP/RTSP) and discrimination between port numbers given thereto.

The feedback information receiving system includes feedback receiver 201a and bit-rate adaptive information receiver 201b.

Feedback receiver 201a corresponds to feedback receiver 201 according to the first exemplary embodiment. Feedback receiver 201a has a function that receives a retransmission request that designates at least one transmission packet to request retransmission. The retransmission request is a feedback for a packet loss caused by GenericNACK described in RFC4585 and regulated as a format of Retransmission extension in NPLT 5.

Bit-rate adaptive information receiver 201b performs an extraction process of information 22 for content rate adaptation. For example, the information is information to dynamically acquire the value of available bandwidth BW(t) described in the first exemplary embodiment. As the value, there can be used the value of "Band Width" designated by RTSP Header at the time when RTSP SETUP or RTSP PLAY for requesting data transmission is requested (see Section 10.2 of NPLT 5). In addition, "information for adapting to continuous media" 22 includes information to correspond to a content rate adapting process. As first information, the information is given to controller 800 (second controller in view of a functional segment).

Controller

Controller 800 is a controller to realize transmission control and content rate adaptive control. First controller 206*a* and second controller 806 are included as functional segments on a program.

First controller 206*a* corresponds to first controller 206 according to the first exemplary embodiment. Based on available bandwidth 213 (BW(t)) and information 212 (AD) related to data scheduled to be transmitted, a flow in FIG. 5 is executed in response to a notification of information 211 related to a retransmission request. Retransmission scheduled information of a retransmission packet obtained by the process in FIG. 5 and determined to be scheduled to be transmitted is returned to controller 800 as second information 802 (step S500*a* in FIG. 9, to be described later).

Second controller 806, in a normal state, executes the content rate adapting process described in NPLT 5 by using the first information to be fed back. Each time a notification of a retransmission request is given, "retransmission scheduled information" (second information) of a retransmission packet is acquired, and it is determined whether or not rate adaptation is required in consideration of a use amount of transmission by the retransmission packet. By using update signal 810, the content rate of continuous media data output unit 202*a* is set or updated.

Figure 9:
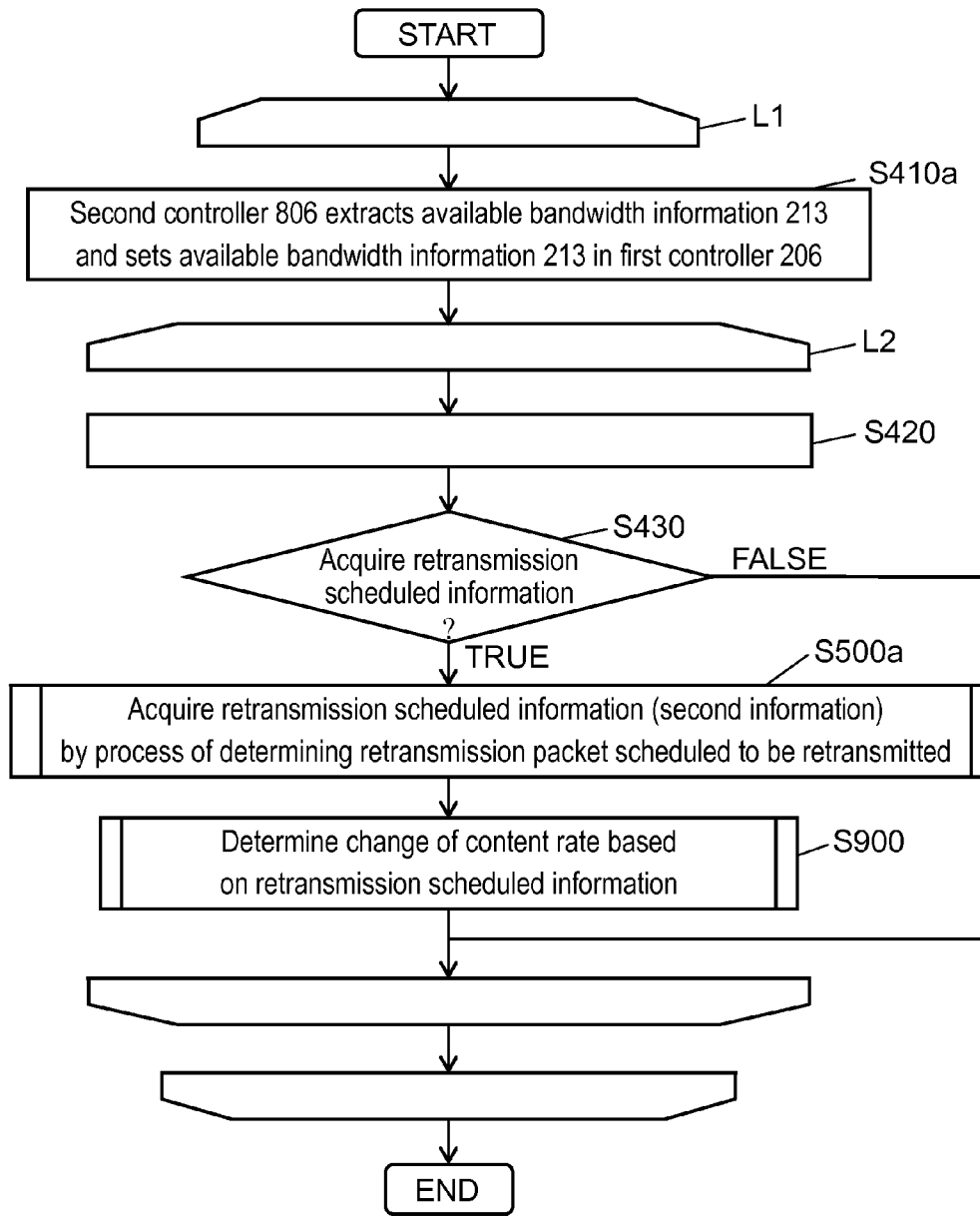
FIG. 9 is a schematic flow chart of a content rate adapting process executed by controller 800.

FIG. 9 is a schematic flow chart of a content rate adapting process executed by controller 800. Steps different from those of the flow in FIG. 4 are denoted with reference numerals different from those in FIG. 4, and the contents thereof will be described.

First, controller 800 executes step S410*a* in place of step S410. In controller 800, second controller 806 serving as one function in controller 800 derives available bandwidth 213 (BW(t)) based on first information 801 and sets available bandwidth 213 (BW(t)) for first controller 206*a*.

Controller 800 executes step S500*a* corresponding to step S500. Step S500 is executed according to the determining process of the retransmission packet scheduled to be retransmitted as described in FIG. 5. However, step S500*a* is different from step S500 in that first controller 206*a* returns the "retransmission scheduled information" (second information) serving as a result of the retransmission determining process to controller 800.

Then, in step S900, controller 800 starts a process of determining whether or not a content rate is changed based on the "retransmission scheduled information" (second information) about a retransmission packet determined to be scheduled to be transmitted.

Figure 10:
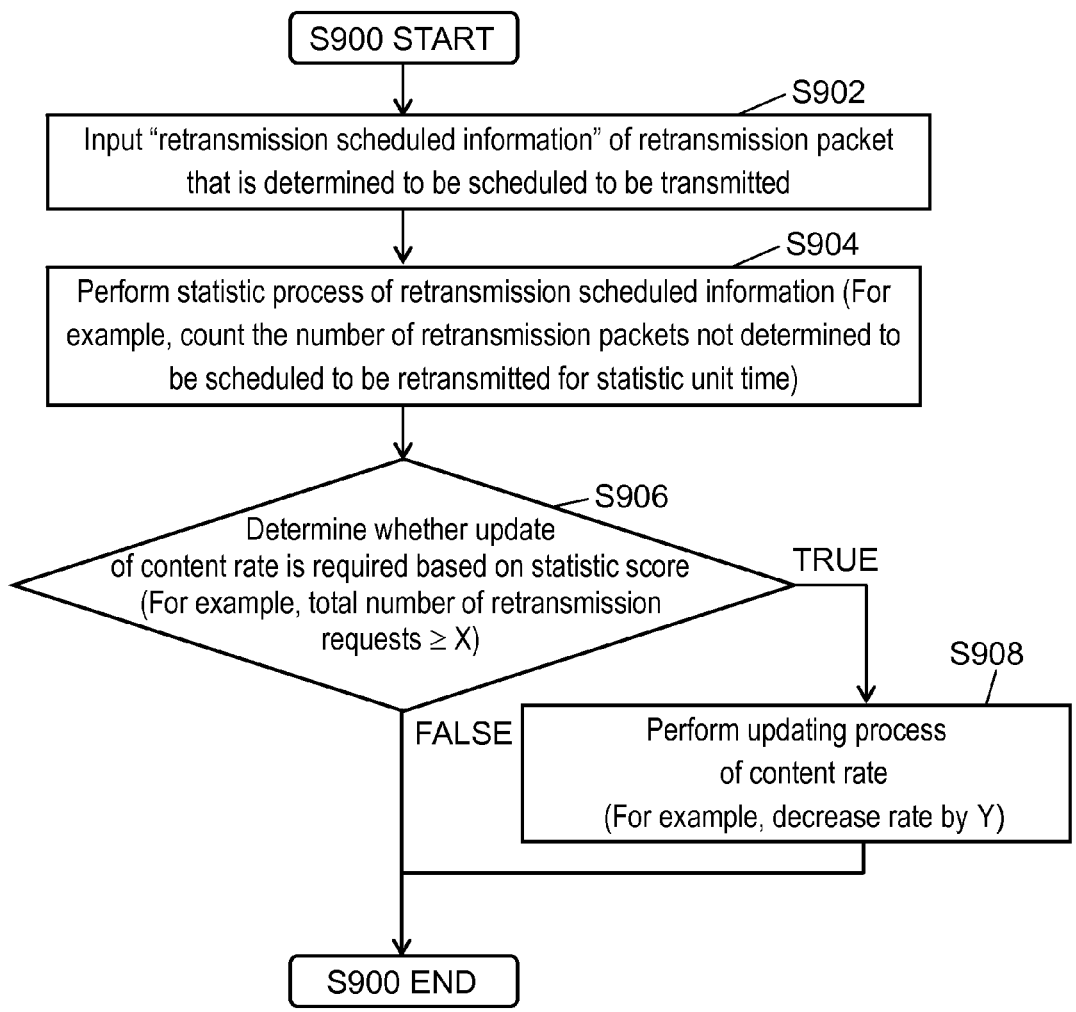
FIG. 10 is a detailed flow chart of step S900 in FIG. 9 executed by controller 800 (a second controller).

FIG. 10 is a detailed flow chart of step S900 in FIG. 9 executed by controller 800 (second controller 806).

Controller 800 (second controller 806) additionally inputs the retransmission scheduled information (second information) at time t. The retransmission scheduled information is information about a retransmission packet determined to be scheduled to be transmitted (or not to be scheduled to be transmitted). For example, in the example in FIG. 6, the number of retransmission packets (retransmissions) determined to be scheduled to be transmitted is four, i.e., r0, r1, r2, and r4. In contrast, a notification of two retransmission packets (retransmissions) r3 and r5 determined not to be scheduled to be transmitted is given.

Then, in step S904, controller 800 (second controller 806) statistically processes the retransmission scheduled information. The statistic process is executed to derive a sum of values (the number of retransmission requests not determined to be scheduled to be retransmitted) of second information notified within a statistical unit time (T_dur in FIG. 11, to be described later).

Then, in step S906, controller 800 (second controller 806) determines whether or not a content rate need to be updated based on a statistic score of the retransmission scheduled information (S906). Criteria for determining whether or not the content rate need to be updated can be set from various perspectives. In this case, when the number of retransmission requests determined to be scheduled to be retransmitted within statistical unit time (T_dur) is larger than a predetermined number, it is determined that the content rate need to be updated. When a ratio of the number of retransmission packets determined to be scheduled to be transmitted (the number of retransmission packets designated by r0, r1, r2, r4, and the like) to the number of retransmission packets not determined to be scheduled to be transmitted (r3, r5, and the like) is larger than a predetermined ratio, it is interpreted that a large number of retransmissions can be executed without a problem, and determined that the content rate need not be updated.

When the determination result in step S906 is FALSE (when it is determined that the content rate at time t need not be updated), the controller returns to the normal process without changing the content rates at that stage.

When the determination result in step S906 is TRUE (when it is determined that the content rate need to be updated), an updating process of the content rate is executed in step S908. Specifically, controller 800 (second controller 806) gives update signal 810 including an instruction for decreasing the content rate by Y (bandwidth Y in FIG. 11) to continuous media data output unit 202*a*.

Figure 11:
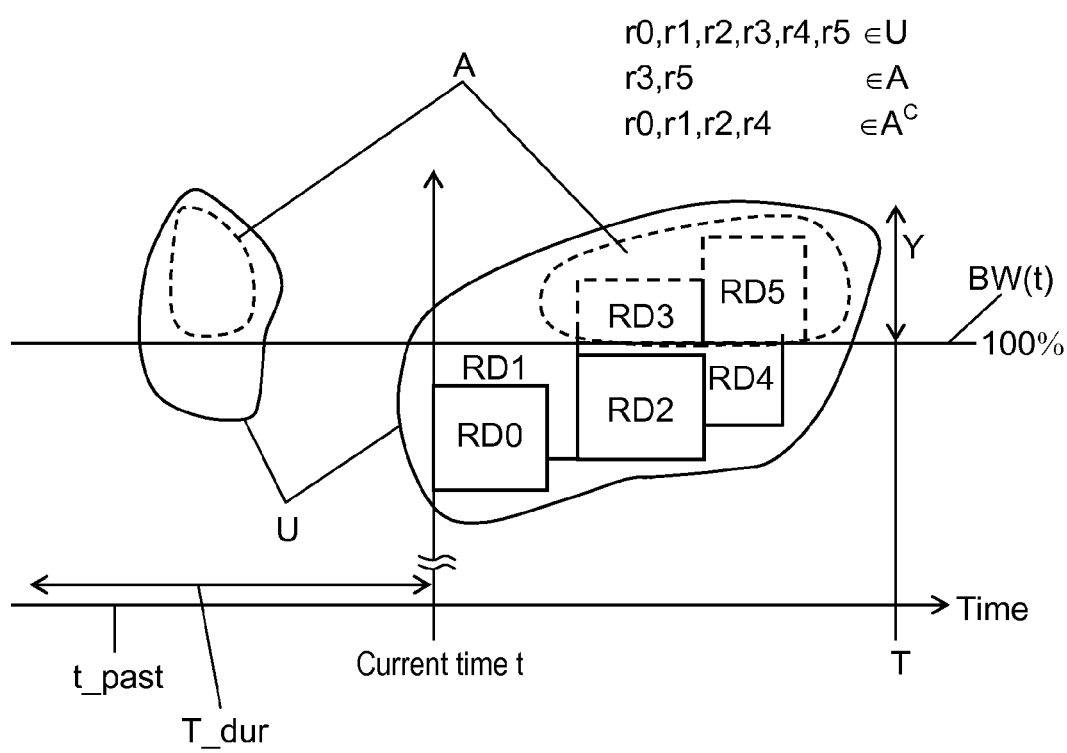
FIG. 11 is a diagram for describing effects of the first and second exemplary embodiments.

FIG. 11 is a diagram for describing effects of the first and second exemplary embodiments.

The horizontal axis and the vertical axis are the same as those in FIG. 12 and FIG. 6. The same reference numerals as in FIG. 12 and FIG. 6 denote the same times and the same elements in FIG. 11, and a description thereof will be omitted.

In control of various rates (transmission rate and content rate) in streaming or the like, use of the number of packet losses is widely employed.

The number of packet losses, when it is considered in minimum units, corresponds to the number of at least one retransmission packet (the number of retransmission requests r0 to r5) designated by 1 GenericNACK at certain time t.

Conventional rate control is equivalent to rate control executed in consideration of set A (solid line and surrounding curved frame) including all the elements of r0 to r5 at certain time t. That is, in FIG. 11, various-rate control is performed on the assumption that six packet losses uniformly occur at, for example, time t without discriminating all elements r0 to r5 of set A from each other.

In contrast, in transmission rate controls (adaptive bit-rate control and retransmission control) in the first and second exemplary embodiments, first, elements (r0 to r5) of total set U serving as a set including all retransmissions as elements are sorted into (1) retransmission packets (set A) not determined to be scheduled to be transmitted and (2) retransmission packets (Ac serving as a complementary set of set A) determined to be scheduled to be transmitted.

Based on the sorted partial information, rate control (or retransmission control in the first exemplary embodiment) is performed. In other words, at a predetermined timing, the rate control (or retransmission control) is performed based on the number (or data amount) of elements of retransmission requests determined to be scheduled to be retransmitted (or not determined to be scheduled to be retransmitted).

In the example in FIG. 11, among the elements (r0 to r5) of set A, four retransmissions r0, r1, r2, and r4 of "retransmission packets that are determined to be scheduled to be transmitted" and retransmissions r3 and r5 that are not determined to be scheduled to be transmitted are discriminated from each other. Based on the latter, the content rate control is executed.

In this manner, first, content rate control can be performed with deviations (while the four data amounts of r0, r1, r2, and r4 are considered as applied bandwidths) from applied bandwidth BW(t) being smaller than that in rate control performed based on the number of simple requests (the number of times of occurrence of packet losses) of retransmission or the data amount of the packet losses.

When temporary transmission interruption occurs in network 10, retransmission requests (packet losses) may burstily occur. Even in this case, when retransmission is predicted to be on time, controller 800 can consider whether retransmission actually reaches the destination without immediately decreasing the content rate to make it possible to perform moderate (robust) rate control suitable for characteristics in use of retransmission in response to bursty occurrence of retransmission requests.

Other Modifications

Although a content output unit sequentially provides information 212 related to data scheduled to be transmitted to a sequential controller, inquiry may be made to the content output unit about a necessary amount at a timing at which the process in step S500 is executed. By a method of acquiring the number of bytes stored in transmission packet buffers 204, the scheduled data amount of a normal packet (or including a retransmission packet read from a retransmission memory) scheduled to be transmitted may also be obtained.

Available bandwidth 213 (BW(t)) set in step S410 may be information acquired by at least first controller 206 before the retransmission schedule determining process shown in step S500 is executed. For example, as described in NPLT 5, a value of "Bandwidth" Syntax negotiated in establishment of session S1 can also be persistently used for RTSP.

Although maximum retransmission waiting time T is derived from a time stamp value of an RTP packet, maximum retransmission waiting time T may be fixedly derived from the sequence number of each RTP packet. When information of a retransmission request includes a time at which a packet loss occurs, a fixing time (for example 500 msec) from the time may be used.

When retransmission scheduled information (second information) that specifies a retransmission packet determined to be scheduled to be transmitted is an information (the number of elements and a data amount) value related to some of elements of total set U, various modifications (the number of retransmission success elements, a retransmission data mount, and the like) can be made.

Although the available bandwidth can be set in consideration of some of various elements of physical link speed to SLA related to the end-to-end service, for the purpose of bit-rate adaptation, the value may be used when correspondence of one value BW(t) to current time ut is determined.

In various feedbacks, (Payload-specific FB messages and Application layer FB messages) described in section 6 of NPLT 3 can also be used.

As a retransmission request that designates at least one transmission packet to request retransmission, in place of GenericNACK (RTCP), "Metrics-Name Successive_Loss" (RTSP) serving as 1 Metric of QoE-Feedback described in NPLT 5 may be used.

In relation to the establishment of session S1, negotiation and updating and the like of a session parameter, data transmission apparatuses 200 and 700 support a PSS Server function, and receiving apparatus 300-1 can support a PSS Client function. Based on the first information, a bit-rate adapting process can be performed in response to feedback of buffer overflow of the receiving apparatus and the like.

IP network 10 may be a 0-hop network. In this case, data transmission apparatuses 200 and 700 and communication apparatus 300-1 are connected to each other with a 2-layer link conforming to various MAC/PHY standards regardless of cable/wireless systems.

In data sending, RTP packet output unit 205 may use not only RTP but also a 4-layer protocol (for example, RTSP or the like). When RTP packet output unit 205 is used as a service on two layers in an apparatus for outputting Audio or Video, RTP packet output unit 205 may be implemented without a normal stack.

RTP packet output unit 205 has a queue to output a normal packet at a predetermined rate, first controller 206 instructs RTP packet output unit 205 to retransmit a retransmission packet determined to be scheduled to be transmitted, and RTP packet output unit 205 may store the retransmission packet instructed to be retransmitted in the queue.

In the first exemplary embodiment, with respect to a retransmission request not determined to be scheduled to be retransmitted, whether or not a retransmission packet is actually issued can be modified as far as implementation permits, when the amount of actual transmission data (retransmission data amount and normal data amount) is smaller than a predictive use amount.

Although the present invention has been described with reference to the above embodiments, the present invention is not limited to the embodiment as a matter of course. The present invention includes the following cases.

(1) Specifically, each of the apparatuses is a computer system including a microprocessor, a ROM, a RAM, a hard disk unit, a display unit, a keyboard, a mouse, and the like. A computer program is stored in the RAM or the hard disk unit. The microprocessor operates according to the computer program to cause the apparatuses to achieve the functions thereof. The computer program mentioned here is configured by combining a plurality of instruction codes representing commands for the computer to achieve predetermined functions.

(2) Some or all of the constituent elements configuring each of the apparatuses may be configured by one system LSI (Large Scale Integration). The system LSI is a super-multifunctional LSI manufactured by integrating a plurality of constituent parts on one chip, and, more specifically, a computer system including a microprocessor, a ROM, a RAM, and the like. A computer program is stored in the RAM. The microprocessor operates according to the computer program to cause the system LSI to achieve the functions thereof.

(3) Some or all of the constituent elements constituting each of the apparatuses may be configured by an IC card or a stand-alone module being detachable from each of the apparatuses. The IC card or the module is a computer system including a microprocessor, a ROM, a RAM, and the like. The IC card or the module may include the super-multi-functional LSI. The microprocessor operates according to the computer program to cause the IC card or the module to achieve the functions thereof. The IC card or the module may have tamper resistance.

(4) The present invention may be the method described above. The present invention may be a computer program that achieves the method with a computer, or may be digital signals configured by the computer program.

The present invention may be a computer-readable recording medium on which the computer program or the digital signals are recorded, for example, a flexible disk, a hard disk, a CD-ROM, an MO, a DVD, a DVD-ROM, a DVD-RAM, a BD (Blu-ray (registered trademark) Disc), or a semiconductor memory. The present invention may be the digital signals recorded on the recording medium.

The present invention may be transmission of the computer program or the digital signals through an electric communication line, a wireless or wired communication line, a network typified by the Internet, data broadcasting, or the like.

The present invention is a computer system including a microprocessor and a memory. The memory stores the computer program, and the microprocessor may operate according to the computer program.

The program or the digital signals are recorded on the recording medium and the recording medium is transferred, or the program or the digital signals are transferred through the network or the like, so that the program may be executed by another independent computer system.

(5) The embodiments and the modifications may be combined with each other.

INDUSTRIAL APPLICABILITY

The communication apparatus (communication method) according to the embodiments of the present invention can be used in a communication apparatus (communication method) that transmits Audio, Video, or the like.

REFERENCE MARKS IN THE DRAWINGS

200, 700 data transmission apparatus
201, 201a feedback receiver
201b bit-rate adaptive information receiver
202 content output unit
202a continuous media data output unit
205, 205a RTP packet output unit
206, 206a first controller
800 controller
806 second controller

The invention claimed is:

1. A communication apparatus comprising:
a packet output unit that performs normal transmission of a normal packet and retransmission of at least one retransmission packet;
a feedback receiver that receives a retransmission request that designates the retransmission packet and requests retransmission, the feedback receiver receiving designation of packets for retransmissions, and the designated retransmission packets including (i) first one or more retransmission packets and (ii) second one or more retransmission packets;
a controller that determines that a retransmission packet requested by the received retransmission request is to be transmitted or is scheduled to be transmitted, based on an amount of data to be transmitted or scheduled to be transmitted for a predetermined period, the controller determining (i) the first one or more retransmission packets to be transmitted to a target apparatus during a first predetermined period, based on a first amount of first data to be transmitted to the target apparatus during the first predetermined period and (ii) the second one or more retransmission packets scheduled to be transmitted to the target apparatus after the first predetermined period; and
a continuous media data output unit that outputs contents at a designated target transmission rate, the contents including the first data and second data, the designated target transmission rate for the first data being a first target transmission rate and the designated target transmission rate for second data scheduled to be transmitted to the target apparatus during the second predetermined period being a second target transmission rate, the second predetermined period being a period immediately after the first predetermined period,
wherein the packet output unit transmits (i) the first data at the first target transmission rate and the first one or more retransmission packets to the target apparatus during the first predetermined period and (ii) the second data at the second target transmission rate and one or more retransmission packets included in the second one or more retransmission packets to the target apparatus during the second predetermined period,
wherein the controller instructs the continuous media data output unit to decrease the target transmission rate when a number of retransmission packets determined not to be scheduled to be transmitted for a unit time is larger than a predetermined amount, and
wherein the controller decreases the target transmission rate from the first target transmission rate to the second transmission rate when a total number of the second one or more retransmission packets is greater than the predetermined amount.

2. The communication apparatus according to claim 1, wherein
the controller determines that the retransmission packet to be determined is scheduled to be transmitted when a total data amount of the data amount and a data amount of the retransmission packet to be determined does not exceed an amount of data that is transmitted for the predetermined period.

3. The communication apparatus according to claim 1, wherein
the controller derives the predetermined period based on information for specifying a retransmission packet included in the retransmission request.

4. The communication apparatus according to claim 1, wherein
the specifying information in the retransmission request includes a sequence number, and
the controller derives the predetermined period based on a retransmission packet time stamp value, the sequence number, or other information described in the retransmission request.

5. The communication apparatus according to claim 1, wherein
the controller rearranges an order of predetermined periods of the at least one retransmission packet such that the periods are determined in order from a shorter period.

6. The communication apparatus according to claim 1, wherein
the packet output unit has a queue to output a normal packet at a predetermined rate,
the controller instructs the packet output unit to retransmit a retransmission packet determined to be scheduled to be transmitted, and
the packet output unit stores in the queue the retransmission packet instructed to be retransmitted.

7. The communication apparatus according to claim 1, wherein
the controller
acquires an available bandwidth BW(t);
acquires information related to data scheduled to be transmitted;
acquires a predetermined period Tk about a kth retransmission packet (k is an integer of 0 or more) for at least one retransmission packet designated by the information related to the retransmission request, when receiving a notification of information related to a retransmission request as a trigger;
acquires data amounts of a normal packet and a retransmission packet that are determined to be scheduled to be transmitted for the predetermined period Tk; and
when the kth retransmission packet is transmitted, determines that the kth retransmission packet is scheduled to be transmitted when an applied bandwidth of the predetermined period Tk does not exceed the available bandwidth, and sequentially repeats foregoing processes.

8. A communication method comprising:
receiving, by a feedback receiver, a retransmission request that designates at least one transmission packet and requests retransmission, the feedback receiver receiving designation of packets for retransmissions, and the designated retransmission packets including (i) first one or more retransmission packets and (ii) second one or more retransmission packets;
determining, by a controller, that a retransmission packet requested by the received retransmission request is to be transmitted or is scheduled to be transmitted, based on an amount of data to be transmitted or scheduled to be transmitted for a predetermined period, the controller determining (i) the first one or more retransmission packets to be transmitted to a target apparatus during a first predetermined period, based on a first amount of first data to be transmitted to the target apparatus during the first predetermined period and (ii) the second one or more retransmission packets scheduled to be transmitted to the target apparatus after the first predetermined period;
outputting contents at a designated target transmission rate, the contents including the first data and second data, the designated target transmission rate for the first data being a first target transmission rate and the designated target transmission rate for second data scheduled to be transmitted to the target apparatus during the second predetermined period being a second target transmission rate, the second predetermined period being a period immediately after the first predetermined period;
instructing to decrease the target transmission rate when a number of retransmission packets determined not to be scheduled to be transmitted for a unit time is larger than a predetermined amount, wherein the target transmission rate is decreased from the first target transmission rate to the second transmission rate when a total number of the second one or more retransmission packets is greater than the predetermined amount; and
performing normal transmission of a normal packet and retransmission of the retransmission packet, wherein (i) during the first predetermined period, the first data is transmitted at the first target transmission rate and the first one or more retransmission packets are transmitted to the target apparatus and (ii) during the second predetermined period, the second data is transmitted at the second target transmission rate and one or more retransmission packets included in the second one or more retransmission packets are transmitted to the target apparatus.

9. A non-transitory computer-readable recording medium storing a control program for causing a device including a processor to execute a method comprising:
receiving, by a feedback receiver, a retransmission request that designates at least one transmission packet and requests retransmission, the feedback receiver receiving designation of packets for retransmissions, and the designated retransmission packets including (i) first one or more retransmission packets and (ii) second one or more retransmission packets;
determining, by a controller, that a retransmission packet for the received retransmission request is to be transmitted or is scheduled to be transmitted, based on an amount of data to be transmitted or scheduled to be transmitted for a predetermined period, the controller determining (i) the first one or more retransmission packets to be transmitted to a target apparatus during a first predetermined period, based on a first amount of first data to be transmitted to the target apparatus during the first predetermined period and (ii) the second one or more retransmission packets scheduled to be transmitted to the target apparatus after the first predetermined period;
outputting contents at a designated target transmission rate, the contents including the first data and second data, the designated target transmission rate for the first data being a first target transmission rate and the designated target transmission rate for second data scheduled to be transmitted to the target apparatus during the second predetermined period being a second target transmission rate, the second predetermined period being a period immediately after the first predetermined period;
instructing to decrease the target transmission rate when a number of retransmission packets determined not to be scheduled to be transmitted for a unit time is larger than a predetermined amount, wherein the target transmission rate is decreased from the first target transmission rate to the second transmission rate when a total number of the second one or more retransmission packets is greater than the predetermined amount; and
performing normal transmission of a normal packet and retransmission of the retransmission packet, wherein (i) during the first predetermined period, the first data is transmitted at the first target transmission rate and the first one or more retransmission packets are transmitted to the target apparatus and (ii) during the second predetermined period, the second data is transmitted at the second target transmission rate and one or more retransmission packets included in the second one or more retransmission packets are transmitted to the target apparatus.

10. The communication apparatus according to claim 2, wherein the packet output unit has a queue to output a normal packet at a predetermined rate, the controller instructs the packet output unit to retransmit a retransmission packet determined to be scheduled to be transmitted, and the packet output unit stores in the queue the retransmission packet instructed to be retransmitted.

11. The communication apparatus according to claim 3, wherein the packet output unit has a queue to output a normal packet at a predetermined rate, the controller instructs the packet output unit to retransmit a retransmission packet determined to be scheduled to be transmitted, and the packet output unit stores in the queue the retransmission packet instructed to be retransmitted.

12. The communication apparatus according to claim 4, wherein the packet output unit has a queue to output a normal packet at a predetermined rate, the controller instructs the packet output unit to retransmit a retransmission packet determined to be scheduled to be transmitted, and the packet output unit stores in the queue the retransmission packet instructed to be retransmitted.

13. The communication apparatus according to claim 5, wherein the packet output unit has a queue to output a normal packet at a predetermined rate, the controller instructs the packet output unit to retransmit a retransmission packet determined to be scheduled to be transmitted, and the packet output unit stores in the queue the retransmission packet instructed to be retransmitted.

* * * * *